(12) United States Patent
Ashok et al.

(10) Patent No.: US 9,529,624 B2
(45) Date of Patent: Dec. 27, 2016

(54) DETERMINING A RELATIVE PRIORITY FOR A JOB USING CONTEXT AND ENVIRONMENTAL CONSIDERATIONS

(71) Applicant: International Business Machines Corporation, Armonk, NY (US)

(72) Inventors: Rohith K. Ashok, Apex, NC (US); Roy F. Brabson, Raleigh, NC (US); Michael J. Burr, Cary, NC (US); Sivaram Gottimukkala, Morrisville, NC (US); Hugh E. Hockett, Raleigh, NC (US); Kristin R. Whetstone, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 503 days.

(21) Appl. No.: 13/758,677

(22) Filed: Feb. 4, 2013

(65) Prior Publication Data

US 2014/0223443 A1 Aug. 7, 2014

(51) Int. Cl.
*G06F 9/46* (2006.01)
*G06F 9/48* (2006.01)

(52) U.S. Cl.
CPC .................. *G06F 9/4881* (2013.01)

(58) Field of Classification Search
None
See application file for complete search history.

(56) References Cited

U.S. PATENT DOCUMENTS

| 7,996,507 | B2 | 8/2011 | Larkin | |
|---|---|---|---|---|
| 8,037,479 | B2* | 10/2011 | Hambrick | G06F 8/20 718/101 |
| 8,769,537 | B1* | 7/2014 | Ruggiero | G06F 9/5027 718/100 |
| 2006/0218558 | A1* | 9/2006 | Torii et al. | 718/107 |
| 2006/0294522 | A1* | 12/2006 | Havens | 718/103 |
| 2010/0238496 | A1 | 9/2010 | Oshima | |
| 2010/0313203 | A1* | 12/2010 | Dawson | G06F 1/3203 718/102 |
| 2011/0185305 | A1 | 7/2011 | Lai et al. | |

(Continued)

OTHER PUBLICATIONS

Mell et al., "The NIST Definition of Cloud Computing," Special Publication 800-145, Sep. 2011.

*Primary Examiner* — Lewis A Bullock, Jr.
*Assistant Examiner* — Wynuel Aquino
(74) *Attorney, Agent, or Firm* — Robert A. Voigt, Jr.; Winstead, P.C.

(57) ABSTRACT

A method, system and computer program product for determining a relative priority for a job. A "policy" is selected based on the job itself and the reason that the job is being executed, where the policy includes a priority range for the job and for an application. A priority for the job that is within the priority range of the job as established by the selected policy is determined based on environmental and context considerations. This job priority is then adjusted based on the priority of the application (within the priority range as established by the policy) becoming the job's final priority. By formulating a priority that more accurately reflects the true priority or importance of the job by taking into consideration the environmental and context considerations, job managers will now be able to process these jobs in a more efficient manner.

9 Claims, 8 Drawing Sheets

(56) References Cited

U.S. PATENT DOCUMENTS

| | | |
|---|---|---|
| 2011/0295999 A1 | 12/2011 | Ferris et al. |
| 2012/0137289 A1 | 5/2012 | Nolterieke et al. |
| 2012/0167108 A1* | 6/2012 | Bowers et al. ............... 718/103 |
| 2012/0185848 A1 | 7/2012 | Devarakonda et al. |

* cited by examiner

DETERMINING A RELATIVE PRIORITY FOR A JOB USING CONTEXT AND ENVIRONMENTAL CONSIDERATIONS

TECHNICAL FIELD

The present invention relates generally to cloud computing, and more particularly to determining a relative priority for a job using context and environmental considerations.

BACKGROUND

In a cloud computing environment, computing is delivered as a service rather than a product, whereby shared resources, software and information are provided to computers and other devices as a metered service over a network, such as the Internet. In such an environment, computation, software, data access and storage services are provided to users that do not require knowledge of the physical location and configuration of the system that delivers the services.

In a virtualized computer environment, such as may be implemented in a physical cloud computing node of the cloud computing environment, the virtualized computer environment includes a virtual operating system. The virtual operating system includes a common base portion and separate user portions that all run on a physical computer. The physical computer is referred to as a host. The common base portion may be referred to as a hypervisor and each user portion may be called a guest. Each guest is a virtual machine of physical resources of the computer. A guest operating system runs on each guest, and the guest appears to the guest operating system as a real computer. Each guest operating system may host one or more virtual machines.

The cloud computing environment handles many types of "jobs," where a job refers to a set of functions that need to be completed in order to a accomplish a given task, such as setting-up a virtual machine, populating data on a virtual machine, configuring a virtual machine, linking multiple virtual machines together, etc. Currently, these jobs are assigned a priority to be executed solely based on resource utilization, such as the utilization of the central processing unit, the memory and the disk (i.e., disk consumption). The priority assigned to these jobs does not take into consideration the dynamic nature of the cloud computing environment or the context and environmental considerations involving the job. As a result, the priority assigned to these jobs may not accurately reflect the true priority or importance of the job thereby causing the jobs to be executed in an inefficient manner.

BRIEF SUMMARY

In one embodiment of the present invention, a method for determining a relative priority for a job comprises selecting a policy based on the job and a reason that the job is being executed, where the policy comprises a priority range for the job and for an application. The method further comprises determining a priority for the job within the priority range for the job based on environmental considerations and context considerations. Furthermore, the method comprises adjusting the priority for the job based on a priority of the application, where the priority of the application is within the priority range for the application. In addition, the method comprises assigning, by a processor, the adjusted priority to the job.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

The present invention comprises a method, system and computer program product for determining a relative priority for a job. In one embodiment of the present invention, a "policy" is selected based on the job itself and the reason that the job is being executed, where the policy includes a priority range for the job and for an application. A "policy" defines the various priorities of a job. These "priorities" are "relative priorities" which determine the likelihood that a job manager will select a given job and process/run that job when there is more than one job waiting to be executed. A priority for the job that is within the priority range of the job as established by the selected policy is determined based on environmental and context considerations. "Environmental considerations" refer to the resources of the cloud computing environment that are being affected by the job. "Context considerations" refer to the context in which the job is running. This job priority (the priority determined based on environmental and context considerations) is then adjusted based on the priority of the application, such as the application running on the virtual machine, where the priority of the application is within the priority range of the application as established by the selected policy. The adjusted priority is then assigned to the job becoming its final priority. By formulating a priority that more accurately reflects the true priority or importance of the job by taking into consideration the environmental and context considerations, job managers will now be able to process these jobs in a more efficient manner.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

It is understood in advance that although this disclosure includes a detailed description on cloud computing, implementation of the teachings recited herein are not limited to a cloud computing environment. Rather, the embodiments of the present invention are capable of being implemented in conjunction with any type of clustered computing environment now known or later developed.

In any event, the following definitions have been derived from the "The NIST Definition of Cloud Computing" by Peter Mell and Timothy Grance, dated September 2011, which is cited on an Information Disclosure Statement filed herewith, and a copy of which is provided to the U.S. Patent and Trademark Office.

Cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction. This cloud model is composed of five essential characteristics, three service models, and four deployment models.

Characteristics are as follows:

On-Demand Self-Service: A consumer can unilaterally provision computing capabilities, such as server time and network storage, as needed, automatically without requiring human interaction with each service's provider.

Broad Network Access: Capabilities are available over a network and accessed through standard mechanisms that promote use by heterogeneous thin or thick client platforms (e.g., mobile phones, tablets, laptops and workstations).

Resource Pooling: The provider's computing resources are pooled to serve multiple consumers using a multi-tenant model, with different physical and virtual resources dynamically assigned and reassigned according to consumer demand. There is a sense of location independence in that the consumer generally has no control or knowledge over the exact location of the provided resources but may be able to specify location at a higher level of abstraction (e.g., country, state or data center). Examples of resources include storage, processing, memory and network bandwidth.

Rapid Elasticity: Capabilities can be elastically provisioned and released, in some cases automatically, to scale rapidly outward and inward commensurate with demand. To the consumer, the capabilities available for provisioning often appear to be unlimited and can be purchased in any quantity at any time.

Measured Service: Cloud systems automatically control and optimize resource use by leveraging a metering capability at some level of abstraction appropriate to the type of service (e.g., storage, processing, bandwidth and active user accounts). Resource usage can be monitored, controlled and reported providing transparency for both the provider and consumer of the utilized service.

Service Models are as follows:

Software as a Service (SaaS): The capability provided to the consumer is to use the provider's applications running on a cloud infrastructure. The applications are accessible from various client devices through either a thin client interface, such as a web browser (e.g., web-based e-mail) or a program interface. The consumer does not manage or control the underlying cloud infrastructure including network, servers, operating systems, storage, or even individual application capabilities, with the possible exception of limited user-specific application configuration settings.

Platform as a Service (PaaS): The capability provided to the consumer is to deploy onto the cloud infrastructure consumer-created or acquired applications created using programming languages, libraries, services and tools supported by the provider. The consumer does not manage or control the underlying cloud infrastructure including networks, servers, operating systems or storage, but has control over the deployed applications and possibly configuration settings for the application-hosting environment.

Infrastructure as a Service (IaaS): The capability provided to the consumer is to provision processing, storage, networks and other fundamental computing resources where the consumer is able to deploy and run arbitrary software, which can include operating systems and applications. The consumer does not manage or control the underlying cloud infrastructure but has control over operating systems, storage and deployed applications; and possibly limited control of select networking components (e.g., host firewalls).

Deployment Models are as follows:

Private Cloud: The cloud infrastructure is provisioned for exclusive use by a single organization comprising multiple consumers (e.g., business units). It may be owned, managed and operated by the organization, a third party or some combination of them, and it may exist on or off premises.

Community Cloud: The cloud infrastructure is provisioned for exclusive use by a specific community of consumers from organizations that have shared concerns (e.g., mission, security requirements, policy and compliance considerations). It may be owned, managed and operated by one or more of the organizations in the community, a third party, or some combination of them, and it may exist on or off premises.

Public Cloud: The cloud infrastructure is provisioned for open use by the general public. It may be owned, managed and operated by a business, academic or government organization, or some combination of them. It exists on the premises of the cloud provider.

Hybrid Cloud: The cloud infrastructure is a composition of two or more distinct cloud infrastructures (private, community or public) that remain unique entities, but are bound together by standardized or proprietary technology that enables data and application portability (e.g., cloud bursting for load balancing between clouds).

Figure 1:
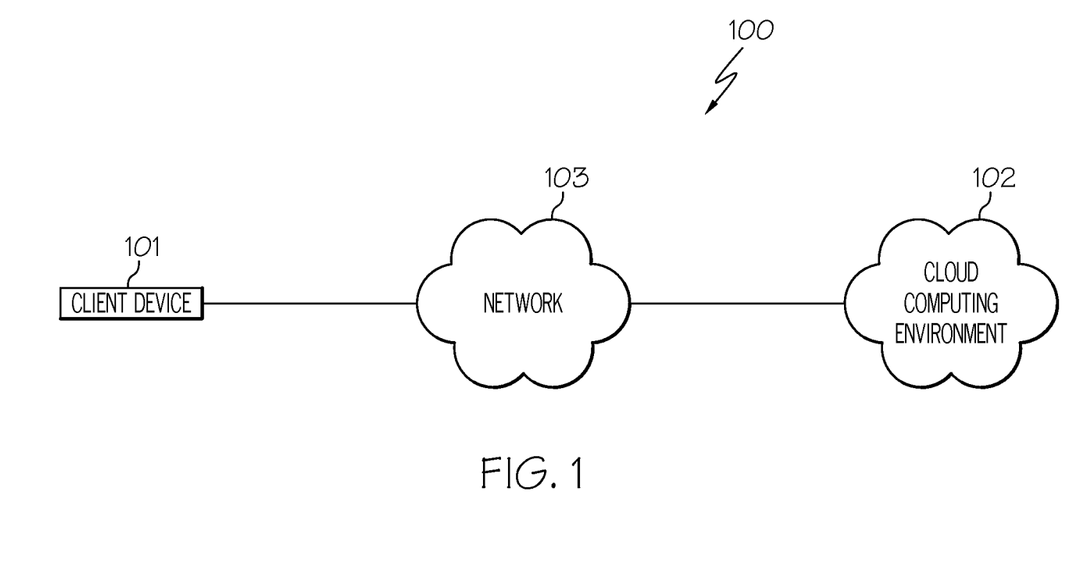
FIG. 1 illustrates a network system configured in accordance with an embodiment of the present invention.

Referring now to the Figures in detail, FIG. 1 illustrates a network system 100 configured in accordance with an embodiment of the present invention. Network system 100 includes a client device 101 connected to a cloud computing environment 102 via a network 103. Client device 101 may be any type of computing device (e.g., portable computing unit, Personal Digital Assistant (PDA), smartphone, laptop computer, mobile phone, navigation device, game console, desktop computer system, workstation, Internet appliance and the like) configured with the capability of connecting to cloud computing environment 102 via network 103.

Network 103 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

Cloud computing environment 102 is used to deliver computing as a service to client device 101 implementing the model discussed above. An embodiment of cloud computing environment 102 is discussed below in connection with FIG. 2.

Figure 2:
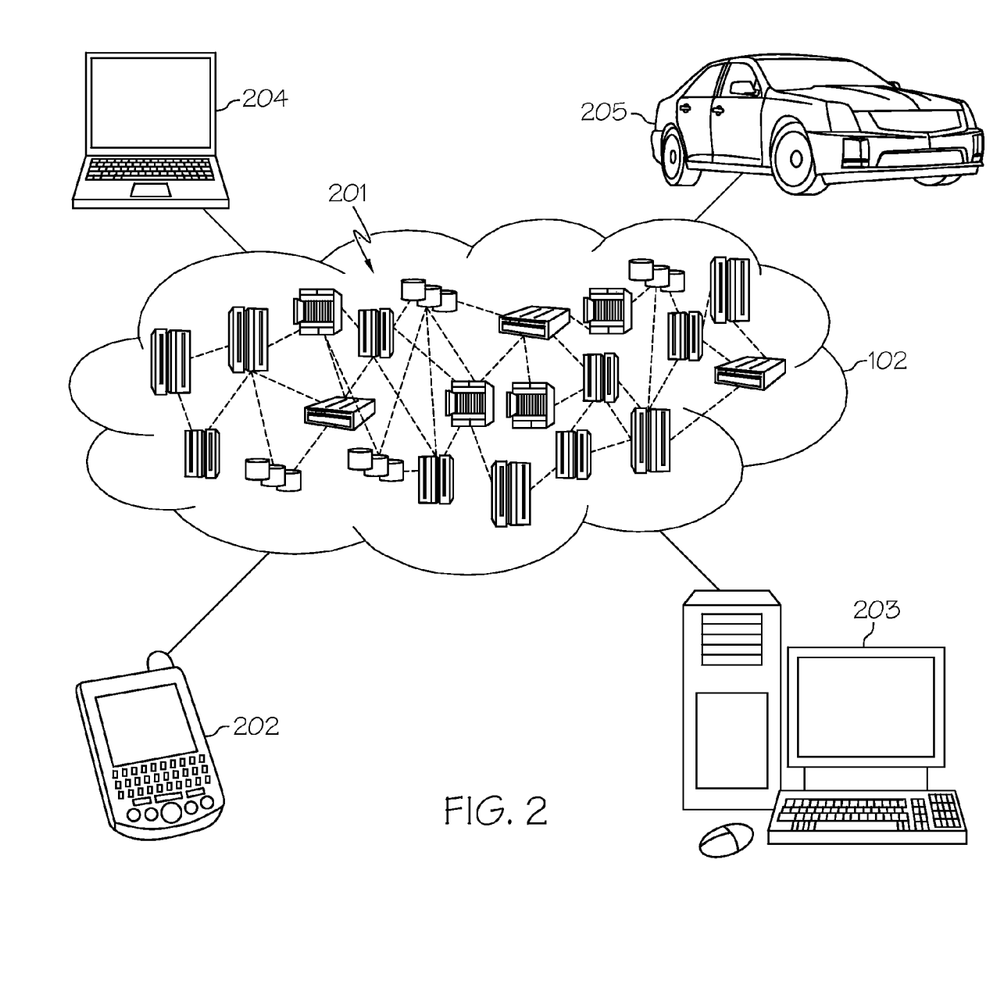
FIG. 2 illustrates a cloud computing environment in accordance with an embodiment of the present invention.

FIG. 2 illustrates cloud computing environment 102 in accordance with an embodiment of the present invention. As shown, cloud computing environment 102 includes one or more cloud computing nodes 201 (also referred to as "clusters") with which local computing devices used by cloud consumers, such as, for example, Personal Digital Assistant (PDA) or cellular telephone 202, desktop computer 203, laptop computer 204, and/or automobile computer system 205 may communicate. Nodes 201 may communicate with one another. They may be grouped (not shown) physically or virtually, in one or more networks, such as Private, Community, Public, or Hybrid clouds as described hereinabove, or a combination thereof. This allows cloud computing environment 102 to offer infrastructure, platforms and/or software as services for which a cloud consumer does not need to maintain resources on a local computing device. Cloud computing nodes 201 may include one or more racks of compute nodes (e.g., servers) that are managed by a server (referred to herein as the "administrative server") in cloud computing environment 102 as discussed below in greater detail in connection with FIG. 3.

It is understood that the types of computing devices 202, 203, 204, 205 shown in FIG. 2, which may represent client device 101 of FIG. 1, are intended to be illustrative and that cloud computing nodes 201 and cloud computing environment 102 can communicate with any type of computerized device over any type of network and/or network addressable connection (e.g., using a web browser). Program code located on one of nodes 201 may be stored on a computer recordable storage medium in one of nodes 201 and downloaded to computing devices 202, 203, 204, 205 over a network for use in these computing devices. For example, a server computer in computing nodes 201 may store program code on a computer readable storage medium on the server computer. The server computer may download the program code to computing device 202, 203, 204, 205 for use on the computing device.

Figure 3:
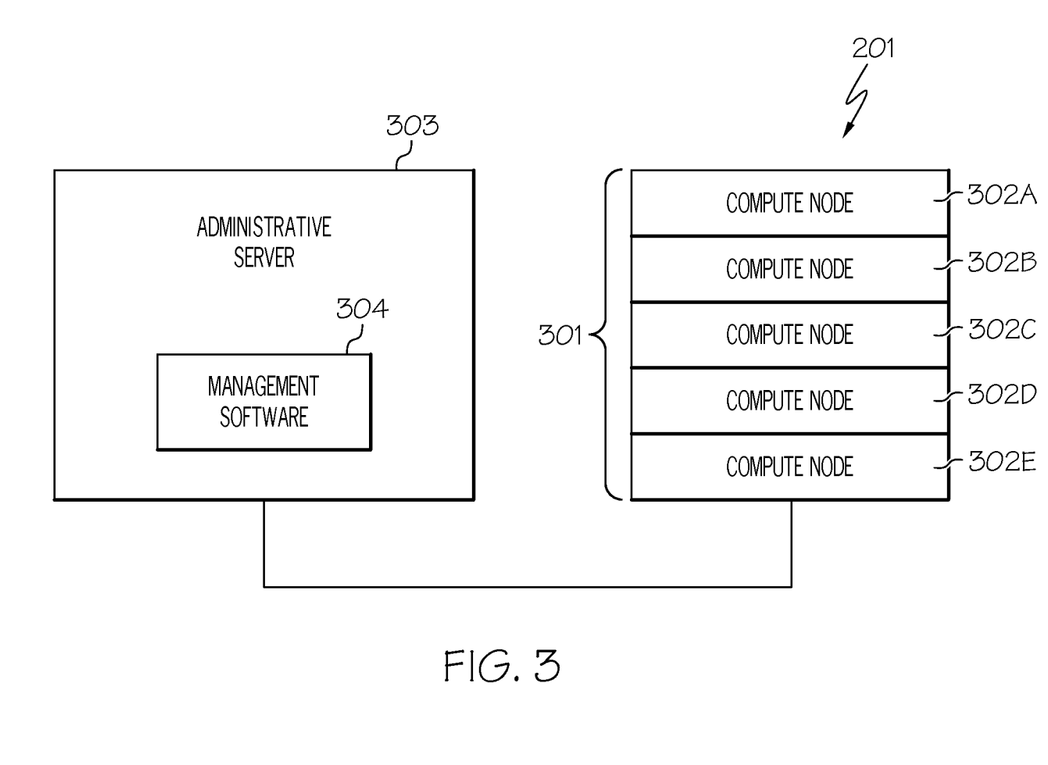
FIG. 3 illustrates a schematic of a rack of compute nodes of the cloud computing node that is managed by an administrative server in accordance with an embodiment of the present invention.

Referring now to FIG. 3, FIG. 3 illustrates a schematic of a rack of compute nodes (e.g., servers) of a cloud computing node 201 that are managed by an administrative server in accordance with an embodiment of the present invention.

As shown in FIG. 3, cloud computing node 201 may include a rack 301 of hardware components or "compute nodes," such as servers or other electronic devices. For example, rack 301 houses compute nodes 302A-302E. Compute nodes 302A-302E may collectively or individually be referred to as compute nodes 302 or compute node 302, respectively. An illustrative virtualization environment for compute node 302 is discussed further below in connection with FIG. 4. FIG. 3 is not to be limited in scope to the number of racks 301 or compute nodes 302 depicted. For example, cloud computing node 201 may be comprised of any number of racks 301 which may house any number of compute nodes 302. Furthermore, while FIG. 3 illustrates rack 301 housing compute nodes 302, rack 301 may house any type of computing component that is used by cloud computing node 201. Furthermore, while the following discusses compute node 302 being confined in a designated rack 301, it is noted for clarity that compute nodes 302 may be distributed across cloud computing environment 102 (FIGS. 1 and 2).

As further shown in FIG. 3, rack 301 is coupled to an administrative server 303 configured to provide data center-level functions. Administrative server 303 supports a module, referred to herein as the management software 304, that can be used to manage all the compute nodes 302 of cloud computing node 201, monitor system utilization, intelligently deploy images of data and optimize the operations of cloud computing environment 102. Furthermore, management software 304 can be used to prioritize jobs based on the environmental considerations (e.g., power consumption of the virtual machine, network congestion, disk congestion and central processing unit congestion) and the context considerations as discussed further below. A description of the hardware configuration of administrative server 303 is provided further below in connection with FIG. 5.

Figure 4:
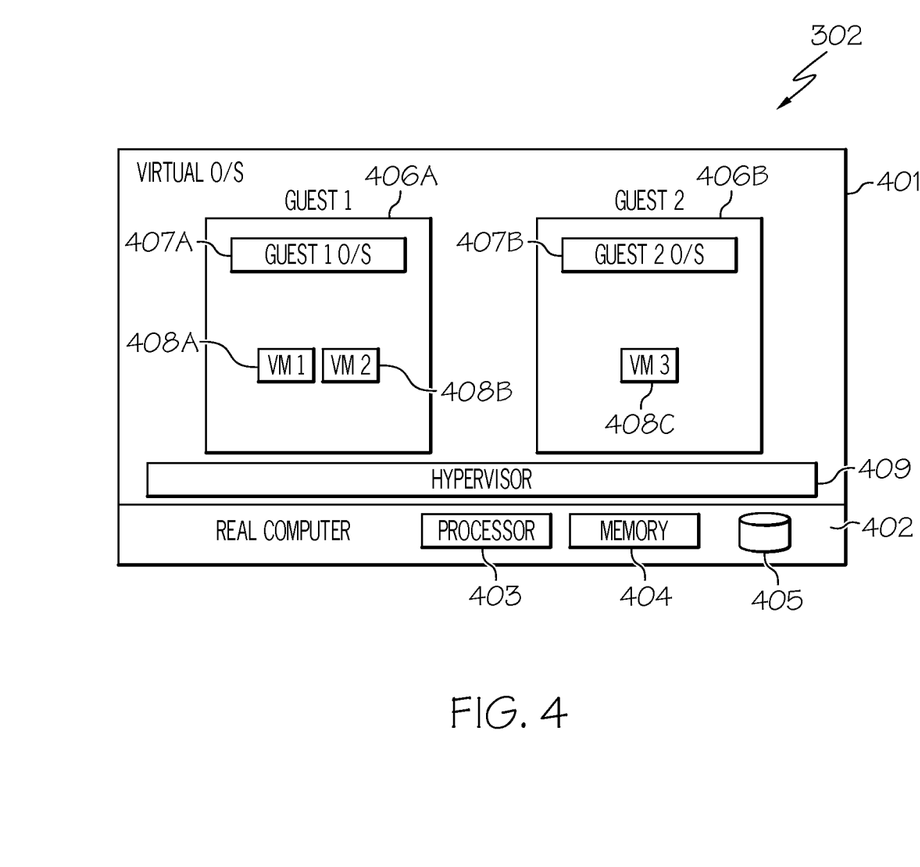
FIG. 4 illustrates a virtualization environment for a compute node in accordance with an embodiment of the present invention.

Referring now to FIG. 4, FIG. 4 illustrates a virtualization environment for compute node 302 (FIG. 3) in accordance with an embodiment of the present invention. Compute node 302 includes a virtual operating system 401. Operating system 401 executes on a real or physical computer 402. Real computer 402 includes one or more processors 403, a memory 404 (also referred to herein as the host physical memory), one or more disk drives 405 and the like. Other components of real computer 402 are not discussed herein for the sake of brevity.

Virtual operating system 401 further includes user portions 406A-406B (identified as "Guest 1" and "Guest 2," respectively, in FIG. 4), referred to herein as "guests." Each guest 406A, 406B is capable of functioning as a separate system. That is, each guest 406A-406B can be independently reset, host a guest operating system 407A-407B, respectively, (identified as "Guest 1 O/S" and "Guest 2 O/S," respectively, in FIG. 4) and operate with different programs. An operating system or application program running in guest 406A, 406B appears to have access to a full and complete system, but in reality, only a portion of it is available. Guests 406A-406B may collectively or individually be referred to as guests 406 or guest 406, respectively. Guest operating systems 407A-407B may collectively or individually be referred to as guest operating systems 407 or guest operating system 407, respectively.

Each guest operating system 407A, 407B may host one or more virtual machine applications 408A-408C (identified as "VM 1," "VM 2" and "VM 3," respectively, in FIG. 4), such as Java™ virtual machines. For example, guest operating system 407A hosts virtual machine applications 408A-408B. Guest operating system 407B hosts virtual machine application 408C. Virtual machines 408A-408C may collectively or individually be referred to as virtual machines 408 or virtual machine 408, respectively.

Virtual operating system 401 further includes a common base portion 409, referred to herein as a hypervisor. Hypervisor 409 may be implemented in microcode running on processor 403 or it may be implemented in software as part of virtual operating system 401. Hypervisor 409 is configured to manage and enable guests 406 to run on a single host.

As discussed above, virtual operating system 401 and its components execute on physical or real computer 402.

These software components may be loaded into memory 404 for execution by processor 403.

The virtualization environment for compute node 302 is not to be limited in scope to the elements depicted in FIG. 4. The virtualization environment for compute node 302 may include other components that were not discussed herein for the sake of brevity.

Figure 5:
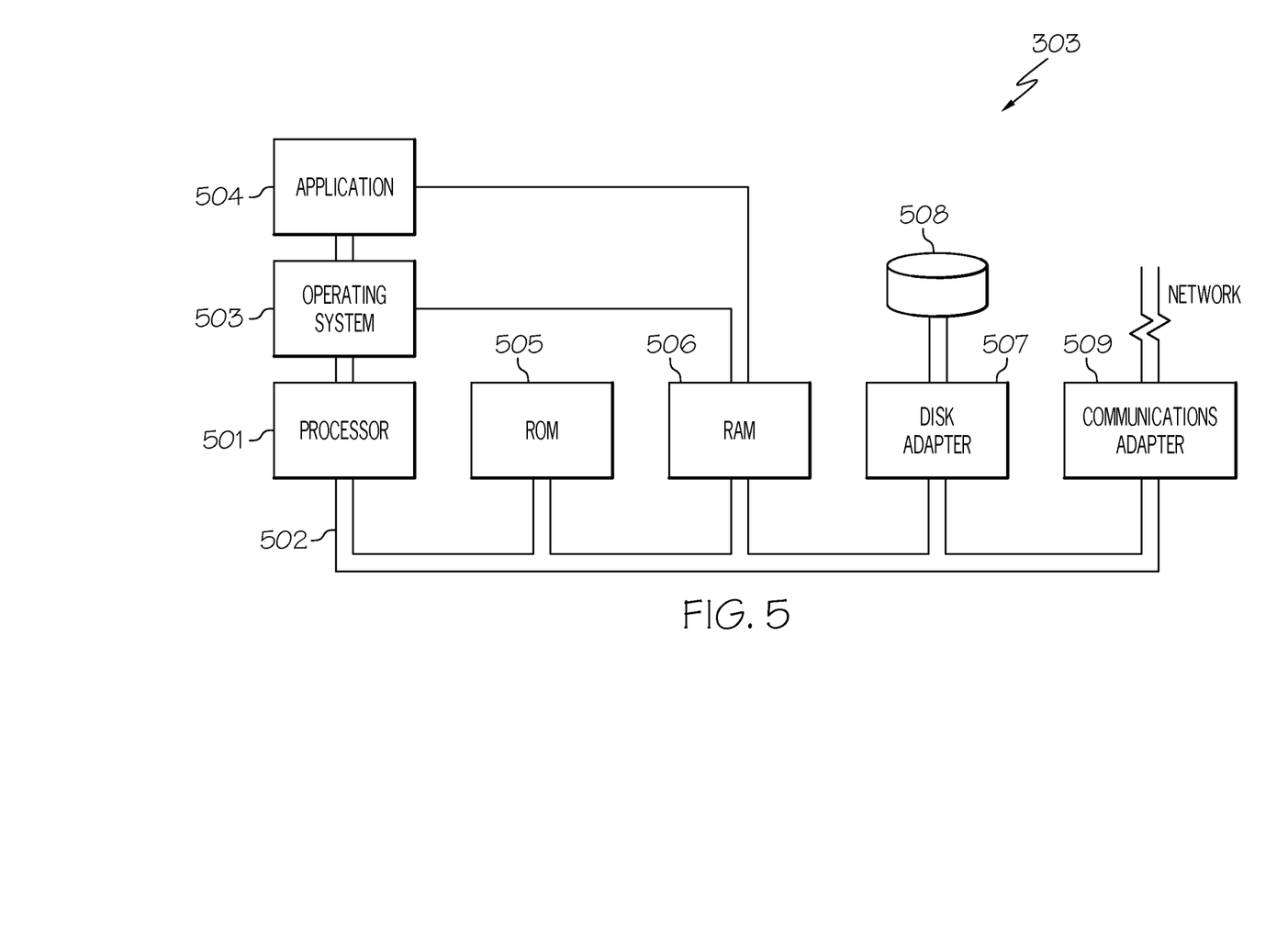
FIG. 5 illustrates a hardware configuration of an administrative server configured in accordance with an embodiment of the present invention.

Referring now to FIG. 5, FIG. 5 illustrates a hardware configuration of administrative server 303 (FIG. 3) which is representative of a hardware environment for practicing the present invention. Administrative server 303 has a processor 501 coupled to various other components by system bus 502. An operating system 503 runs on processor 501 and provides control and coordinates the functions of the various components of FIG. 5. An application 504 in accordance with the principles of the present invention runs in conjunction with operating system 503 and provides calls to operating system 503 where the calls implement the various functions or services to be performed by application 504. Application 504 may include, for example, a program (e.g., management software 304 of FIG. 3) for prioritizing jobs based on the environmental considerations (e.g., power consumption of virtual machine 408 of FIG. 4, network congestion, disk congestion and central processing unit congestion) and the context considerations as discussed further below in association with FIGS. 6 and 7A-7B.

Referring again to FIG. 5, read-only memory ("ROM") 505 is coupled to system bus 502 and includes a basic input/output system ("BIOS") that controls certain basic functions of administrative server 303. Random access memory ("RAM") 506 and disk adapter 507 are also coupled to system bus 502. It should be noted that software components including operating system 503 and application 504 may be loaded into RAM 506, which may be administrative server's 303 main memory for execution. Disk adapter 507 may be an integrated drive electronics ("IDE") adapter that communicates with a disk unit 508, e.g., disk drive. It is noted that the program for prioritizing jobs based on the environmental considerations and the context considerations, as discussed further below in association with FIGS. 6 and 7A-7B, may reside in disk unit 508 or in application 504.

Administrative server 303 may further include a communications adapter 509 coupled to bus 502. Communications adapter 509 interconnects bus 502 with an outside network (e.g., network 103 of FIG. 1).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As stated in the Background section, currently, the cloud computing environment handles many types of "jobs," where a job refers to a set of functions that need to be completed in order to a accomplish a given task, such as setting-up a virtual machine, populating data on a virtual machine, configuring a virtual machine, linking multiple virtual machines together, etc. Currently, these jobs are assigned a priority to be executed solely based on resource utilization, such as the utilization of the central processing unit, the memory and the disk (i.e., disk consumption). The priority assigned to these jobs does not take into consideration the dynamic nature of the cloud computing environment or the context and environmental considerations involving the job. As a result, the priority assigned to these jobs may not accurately reflect the true priority or importance of the job thereby causing the jobs to be executed in an inefficient manner.

Figure 6:
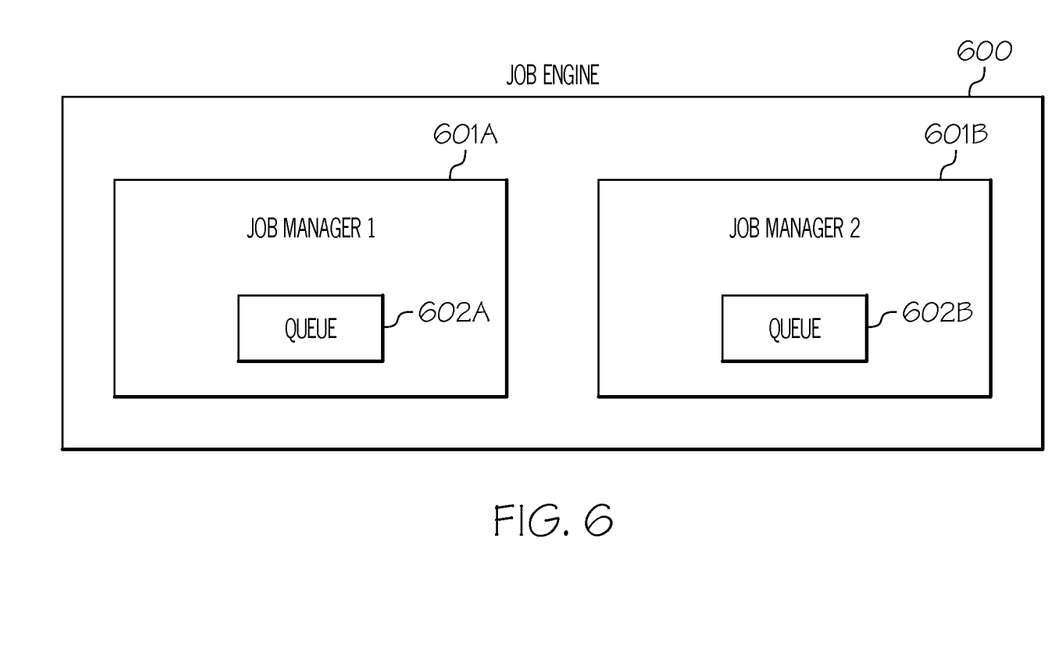
FIG. 6 illustrates the software components used in assigning a priority to the jobs by taking into consideration the environmental and context considerations in accordance with an embodiment of the present invention.
Figure 7A:
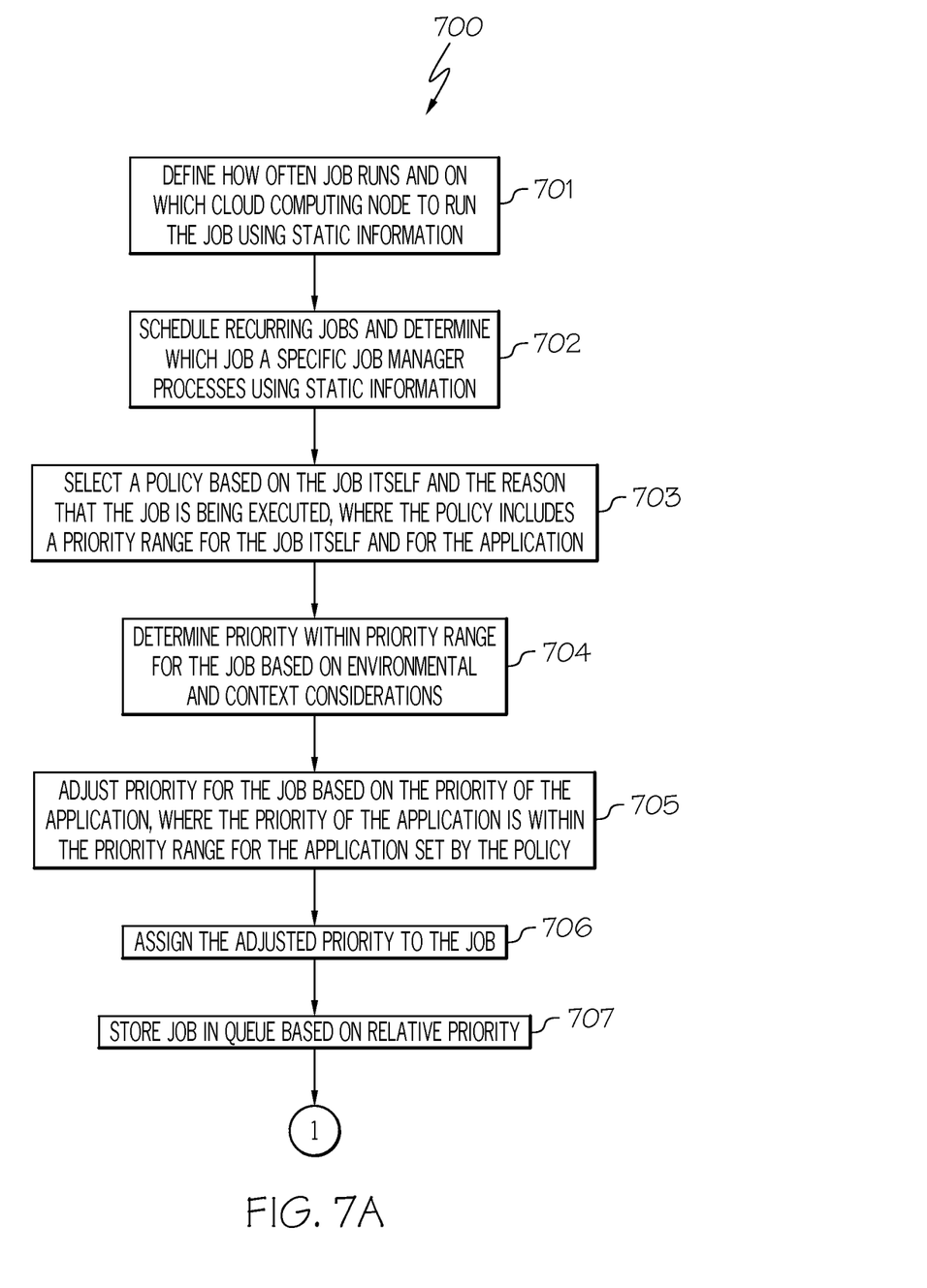
FIGS. 7A-7B are a flowchart of a method for assigning a priority to the jobs by taking into consideration the environmental and context considerations in accordance with an embodiment of the present invention.
Figure 7B:
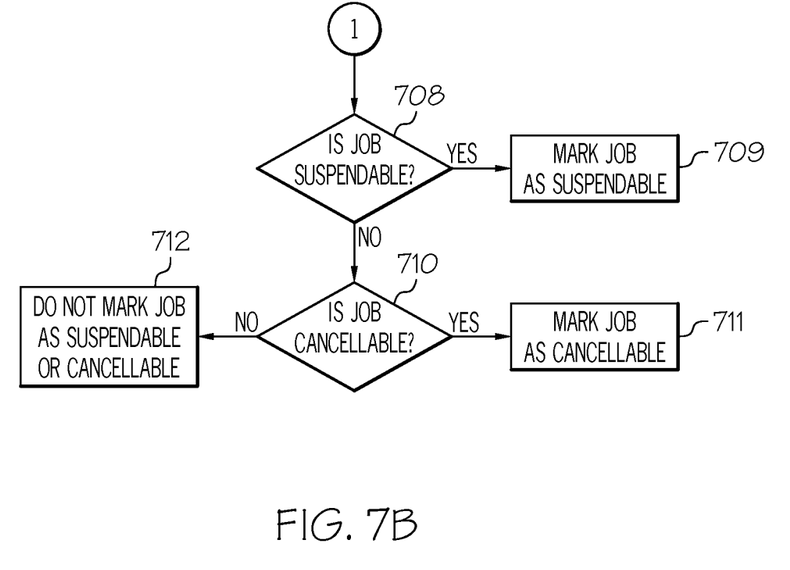

The principles of the present invention provide a means for assigning a priority to these jobs that more accurately reflects the true priority or importance of the job by taking into consideration the environmental considerations (e.g., power consumption of the virtual machine, network congestion, disk congestion and central processing unit congestion) and the context considerations (e.g., context of the application running on the virtual machine) as discussed further below in connection with FIGS. 6 and 7A-7B. FIG. 6 illustrates the software components used in assigning a priority to the jobs that more accurately reflects the true priority or importance of the job by taking into consideration the environmental and context considerations. FIGS. 7A-7B are a flowchart of a method for assigning a priority to the jobs by taking into consideration the environmental and context considerations.

Referring now to FIG. 6, as stated above, FIG. 6 is a diagram of the software components used in assigning a priority to the jobs by taking into consideration the environmental and context considerations in accordance with an embodiment of the present invention. In one embodiment, these software components may reside in application 504 (FIG. 5).

The following provides a brief description of these software components. A more detailed description of these software components is provided below in conjunction with FIGS. 7A-7B, where their functionalities are discussed in connection with the method for assigning a priority to the jobs by taking into consideration the environmental and context considerations.

The software components used in assigning a priority to the jobs include a job engine 600 configured to assign a priority to the jobs. A "job," as used herein, refers to a set of functions that need to be completed in order to a accomplish a given task, such as setting-up a virtual machine, populating data on a virtual machine, configuring a virtual machine, and linking multiple virtual machines together.

As illustrated in FIG. 6, job engine 600 includes a job manager 601A, 601B (job manager 601A is identified as "job manager 1" and job manager 601B is identified as "job manager 2" in FIG. 6). Job managers 601A-601B may collectively or individually be referred to as job managers 601 or job manager 601, respectively. In one embodiment, job managers 601 are responsible for executing or processing the jobs.

Each job manager 601A-601B may include a queue 602A-602B, respectively, configured to hold the jobs to be executed. Queues 602A-602B may collectively or individually be referred to as queues 602 or queue 602, respectively.

A method for assigning a priority to the jobs by taking into consideration the environmental and context considerations using the software components of FIG. 6 will now be discussed in connection with FIGS. 7A-7B. FIGS. 7A-7B are a flowchart of a method 700 for assigning a priority to the jobs by taking into consideration the environmental and context considerations in accordance with an embodiment of the present invention.

Referring to FIG. 7A, in conjunction with FIGS. 1-6, in step 701, job engine 600 defines how often a job runs and on which cloud computing node 201 to run the job using metadata that contains static information.

In step 702, job engine 600 schedules recurring jobs and determines which job a specific job manager 601 processes using metadata that contains static information.

In step 703, job engine 600 selects a policy based on the job itself and the reason that the job is being executed, where the policy includes a priority range for the job itself and for an application, such as the application running on virtual machine 408. A "policy," as used herein, defines the various priorities of a job. These "priorities" are "relative priorities" which determine the likelihood that a job manager 601 will select a given job and process/run that job when there is more than one job waiting to be executed. For example, higher priority jobs are more likely to be selected by job manager 601 for execution while lower priority jobs are more likely to wait for the higher priority jobs to complete execution prior to being executed. In one embodiment, a fairness algorithm is implemented by job engine 600 to ensure that lower priority jobs will eventually execute even where there are always higher priority jobs available.

In step 704, job engine 600 determines the priority of the job within the priority range of the job as established by the selected policy based on environmental and context considerations (e.g., application running on virtual machine 408). "Environmental considerations," as used herein, refer to the resources of cloud computing environment 102 that are being affected by the job. For example, environmental considerations include the power consumption of virtual machine 408, network consumption, disk congestion and central processing unit congestion. "Context considerations," as used herein, refer to the context in which the job is running. For instance, the context of an application running on virtual machine 408 may be taken into consideration in determining the priority of a job. By understanding the context considerations, the environmental considerations that are most important in determining the priority of the job can be determined. For example, in the context of a database management system, the disk congestion is considered to be one of the most important environmental factors in determining the priority of the job. However, in the context of a web application server, the central processing unit congestion is considered to be one of the most important environmental factors in determining the priority of the job. Based on the environmental and context considerations, a priority of a job is determined that falls within the priority range of the job as established by the selected policy.

In step 705, job engine 600 adjusts the priority of the job (determined in step 704) based on the priority of the application, such as the application running on virtual machine 408, where the priority of the application is within the priority range of the application as established by the selected policy. For example, a relative priority of the application running on virtual machine 408 may be specified when defining the virtual machine pattern (referring to the layout of virtual machines 408 on compute nodes 302). Job engine 600 then adjusts the job priority based on the application priority. For example, high priority applications would result in increasing the job priority; whereas, low priority applications would result in decreasing the job priority.

After adjusting the priority of the job in step 705, job engine 600 assigns the adjusted priority to the job becoming its final priority in step 706.

In step 707, job engine 600 stores the job in queue 602 based on its final priority. As discussed above, the likelihood that a job manager 601 will select a given job in queue 602 to process/run that job is based on the priority assigned to the job. By formulating a priority that more accurately reflects the true priority or importance of the job by taking into consideration the environmental and context considerations, job managers 601 will now be able to process these jobs in a more efficient manner.

Referring now to FIG. 7B, in conjunction with FIGS. 1-6, in step 708, a determination is made by job engine 600 as to whether the job is suspendable. "Suspendable," as used herein, refers to a job that may be paused at any time if a higher priority job became available to be executed. The suspendable job could then be executed at a later point in time.

If the job is suspendable, then, in step 709, job engine 600 marks the job as suspendable. By marking the job as suspendable, higher priority jobs may be able to get immediate attention.

If, however, the job is not suspendable, then, in step 710, a determination is made by job engine 600 as to whether the job is cancellable. "Cancellable," as used herein, refers to a job that can be removed from queue 602 when a higher priority job is placed in queue 602.

If the job is cancellable, then, in step 711, job engine 600 marks the job as cancellable. By marking the job as cancellable, higher priority jobs may be able to get immediate attention.

If, however, the job is not suspendable or cancellable, then, in step 712, job engine 600 does not mark the job as suspendable or cancellable.

In some implementations, method 700 may include other and/or additional steps that, for clarity, are not depicted. Further, in some implementations, method 700 may be executed in a different order presented and that the order presented in the discussion of FIGS. 7A-7B is illustrative. Additionally, in some implementations, certain steps in method 700 may be executed in a substantially simultaneous manner or may be omitted.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for determining a relative priority for a job, the method comprising:
    defining how often the job runs and on which cloud computing node to run the job using static information;
    scheduling recurring jobs and determining which job a specific job manager processes using the static information;
    selecting a policy based on the job and a reason that the job is being executed, wherein the policy comprises a priority range for the job and for an application, wherein said job comprises a set of functions that need to be completed in order to accomplish a given task;
    determining a priority for the job within the priority range for the job based on environmental considerations and context considerations, wherein said environmental considerations comprise resources of a cloud computing environment that are being affected by said job, wherein said context considerations comprise a context of the effects of the job running on software of the cloud computing node;
    adjusting the priority for the job based on a priority of the application, wherein the priority of the application is within the priority range for the application as established by said selected policy;
    assigning, by a processor, the adjusted priority to the job becoming its final priority after adjusting the priority for the job;
    storing the job in a queue based on its final priority;
    determining a priority of a subsequent job available for execution; and
    if the subsequent job has higher priority:
        marking the job as suspendable in response to the job determined to be suspendable by pausing the suspended job and executing the subsequent job; or
        marking the job as cancellable in response to the job being determined to be cancellable by removing the job from the queue and executing the subsequent job.

2. The method as recited in claim 1, wherein the environmental considerations comprise one or more of the following: power consumption of a virtual machine, network congestion, disk congestion and central processing unit congestion.

3. The method as recited in claim 1, wherein the context considerations comprises a context of an application running on a virtual machine.

4. A computer program product embodied in a non-transitory computer readable storage medium for determining a relative priority for a job, the computer program product comprising the programming instructions for:
    defining how often the job runs and on which cloud computing node to run the job using static information;
    scheduling recurring jobs and determining which job a specific job manager processes using the static information;
    selecting a policy based on the job and a reason that the job is being executed, wherein the policy comprises a priority range for the job and for an application, wherein said job comprises a set of functions that need to be completed in order to accomplish a given task;
    determining a priority for the job within the priority range for the job based on environmental considerations and context considerations, wherein said environmental considerations comprise resources of a cloud computing environment that are being affected by said job, wherein said context considerations comprise a context of the effects of the job running on software of the cloud computing node;

adjusting the priority for the job based on a priority of the application, wherein the priority of the application is within the priority range for the application as established by said selected policy;

assigning the adjusted priority to the job becoming its final priority after adjusting the priority for the job;

storing the job in a queue based on its final priority;

determining a priority of a subsequent job available for execution; and if the subsequent job has higher priority:
marking the job as suspendable in response to the job determined to be suspendable by pausing the suspended job and executing the subsequent job; or
marking the job as cancellable in response to the job being determined to be cancellable by removing the job from the queue and executing the subsequent job.

5. The computer program product as recited in claim 4, wherein the environmental considerations comprise one or more of the following: power consumption of a virtual machine, network congestion, disk congestion and central processing unit congestion.

6. The computer program product as recited in claim 4, wherein the context considerations comprises a context of an application running on a virtual machine.

7. A system, comprising:
a memory unit for storing a computer program for determining a relative priority for a job; and
a processor coupled to the memory unit, wherein the processor, responsive to the computer program, comprises:
circuitry for defining how often the job runs and on which cloud computing node to run the job using static information;
circuitry for scheduling recurring jobs and determining which job a specific job manager processes using the static information;
circuitry for selecting a policy based on the job and a reason that the job is being executed, wherein the policy comprises a priority range for the job and for an application, wherein said job comprises a set of functions that need to be completed in order to accomplish a given task;
circuitry for determining a priority for the job within the priority range for the job based on environmental considerations and context considerations, wherein said environmental considerations comprise resources of a cloud computing environment that are being affected by said job, wherein said context considerations comprise a context of the effects of the job running on software of the cloud computing node;
circuitry for adjusting the priority for the job based on a priority of the application, wherein the priority of the application is within the priority range for the application as established by said selected policy;
circuitry for assigning the adjusted priority to the job becoming its final priority after adjusting the priority for the job;
circuitry for storing the job in a queue based on its final priority;
circuitry for determining a priority of a subsequent job available for execution; and
if the subsequent job has higher priority:
circuitry for marking the job as suspendable in response to the job determined to be suspendable by pausing the suspended job and executing the subsequent job; or
circuitry for marking the job as cancellable in response to the job being determined to be cancellable by removing the job from the queue and executing the subsequent job.

8. The system as recited in claim 7, wherein the environmental considerations comprise one or more of the following: power consumption of a virtual machine, network congestion, disk congestion and central processing unit congestion.

9. The system as recited in claim 7, wherein the context considerations comprises a context of an application running on a virtual machine.

* * * * *